G. H. AMES.
CAR-COUPLING.
No. 171,755. Patented Jan. 4, 1876.
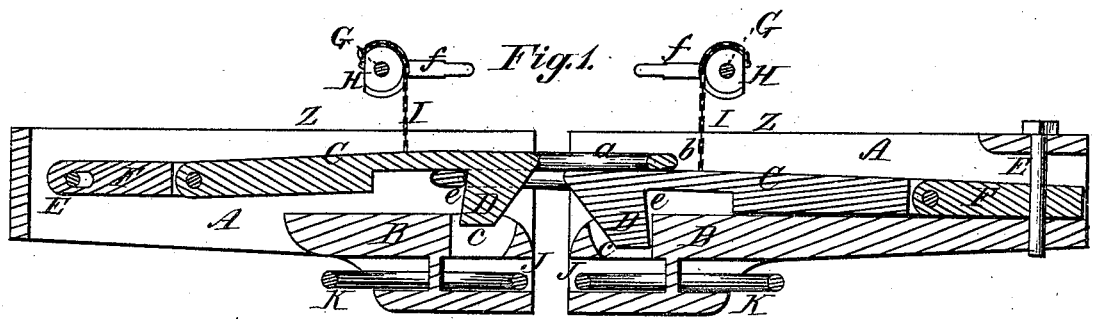
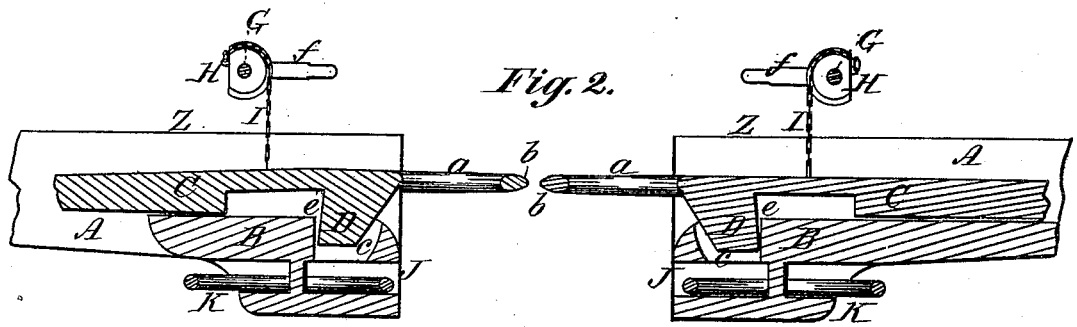
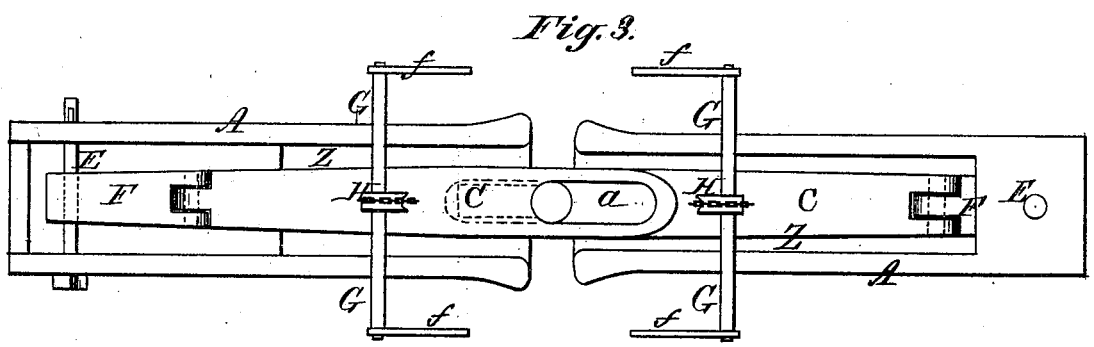
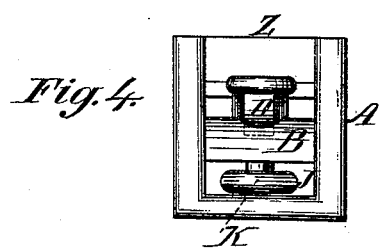
Witnesses:
Inventor:
Gillman H. Ames,
by Johnson and Johnson,
Att'ys.

UNITED STATES PATENT OFFICE.

GILLMAN H. AMES, OF ADRIAN, MICHIGAN.

IMPROVEMENT IN CAR-COUPLINGS.

Specification forming part of Letters Patent No. 171,755, dated January 4, 1876; application filed September 28, 1875.

CASE B.

*To all whom it may concern:*

Be it known that I, GILLMAN H. AMES, of Adrian, in the county of Lenawee and State of Michigan, have invented certain new and useful Improvements in Car-Couplings; and I do hereby declare that the following is a full, clear, and exact description thereof, which will enable others skilled in the art to which it pertains to make and use the same, reference being had to the accompanying drawing, and to the letters of reference marked thereon, which form a part of this specification.

I have improved the coupling for railway-cars as patented to me October 27, 1874, with a view to render it more simple, easily applied, and more effective. To this end I have combined a slotted and hooked coupling-bar with an attaching shank or stem, which, being jointed or fixed to the draw-head, is also jointed to the inner end of the coupling-bar, whereby the latter is not only held in its horizontal position, but has a perfect freedom for coupling and uncoupling. The free ends of these bars extend beyond the draw-heads, and in positions so that when the bars are brought together the slotted front end of one of the bars will pass under and raise the other bar until its hook or prong drops into the receiving-slot, which completes the operation.

In my patent referred to the hook of the bar rested upon the bottom of the draw-head, which was also made solid to support the rear end of the bar. My present improvement allows the hook to pass through the slot of the bar and into an opening in the bottom of the draw-head, thereby admitting of a longer and more secure hook, and serving to hold it in place more certainly. In connection with this slotted and hooked coupling-bar, I have also combined a draw-head open at its top, in order thereby to allow the coupling to rise high enough to effect the uncoupling and dispense with a high closed draw-head.

In the accompanying drawings, Figure 1 represents a longitudinal section of my coupling device as applied with draw-heads and coupled; Fig. 2, a similar view, uncoupled; Fig. 3, a top view; Fig. 4, an end view; and Fig. 5, a view of a slightly-modified form of coupling-bar.

The draw-heads A are open, at the top Z, throughout their length, or nearly so, and may also be open at their lower sides, except near their front ends, which must be closed to form a bottom support, B, for the front end of the coupling-bar, and upon which, also, the under coupled bar rests. The bars C I make from two and a half to four feet long and about fifty pounds in weight. Each is provided with a hook, D, on the under side, near its front end, and a slot, $a$, of sufficient length to allow of the necessary play of the coupling. The slotted ends are slightly flattened at the point $b$, and have more metal than the sides of the slot, in order to give them greater strength, and to allow them to pass each other readily on coming together, for, whether they strike in line or above or below such line, they will glide over one another, and automatically couple by the hook D of one entering the slot $a$ of the other, and also enter the opening $c$ in the bottom support B of the draw-head, and when so coupled the weight of the bar keeps it down and makes it secure. The hook D projects enough from the bar to enter the opening $c$, and gives, by its inwardly-inclined side $e$, a downward draft, with a firm hold and bearing upon the bottom support. These coupling-bars are each jointed to a shank or stem, F, which is, in turn, jointed to the inner end of the draw-head. This jointed connection allows the bar to be raised at its front end to be uncoupled from the other bar, and the open-top draw-bar gives freedom for this action.

The joint of the shank F may be by a vertical or horizontal bolt, E.

I do not confine myself, however, to a jointed connection for the coupling-bar, as it may be connected to the draw-head without a joint, but having a sufficient play to allow of the vertical movement of its front end.

The open-top draw-heads also give the advantage of allowing the coupling-bars to uncouple themselves in the event of the cars being turned over from the track, as the bars will then fall out of the open side Z and separate, the space between the draw-head and the platform being sufficient for this purpose. This construction also lessens the expense of the draw-heads.

As stated, the long bars will keep safely coupled by their weight and the downward pull upon the hook D, and they are easily uncoupled by simply lifting their free ends. The device for effecting this consists of a transverse shaft, G, and pulley H, journaled in the dead-wood of the car, or to the end of the car, and connected to the front end of the bar, in rear of the hook D, by a chain, I. The shaft has handles $f$ at the sides of the car, and, by turning either, winds the chain upon the pulley H, and thus raises the attached draw-bar to separate the cars. At the bottom of the front portion of the draw-head there is formed a supplementary link-chamber, J, which is designed to be used with the ordinary coupling-link K and pin of cars not provided with my improved coupling.

The coupling-bars may be used without draw-heads, in which case they are secured to a cross-beam or bumper of the car, with the end of the bar made cylindrical, and secured to the bumper-spring in a manner to allow of its free coupling and uncoupling action, and the weight of the bars will hold them coupled. In this case the bars are held in positions to couple by means of a lug-iron passing under each bar toward the front, and is fastened to the dead-wood or front of the car above. In either case the uncoupling is effected by lifting the front end of the upper bar.

The open-top draw-head Z gives the advantage of using a longer hook than if it were closed, for, in the latter case, the draw-head would have to be high enough to allow of such movement, and in this respect is an improvement upon my patented coupling.

I claim—

1. The long coupling-bars C, having a hook, D, and a slot, $a$, and connected at their inner ends to the draw-bars or the car, and their coupling ends free to be raised, whereby the coupling-bars may rise and fall to couple and uncouple, draw from their connected ends, and be held in horizontal positions.

2. The combination, with the long slotted and hooked coupling-bars C, of the jointed shanks or stems F, as described.

3. The combination, with the coupling-bars C, having each an under hook, D, and an end slot, $a$, and operating to couple one over and upon the other, of the open-top draw-head Z, whereby the coupled bars will drop out of the draw-heads and be separated in the event of the accidental overturning of the cars, as shown and described.

In testimony that I claim the foregoing I have affixed my signature in presence of two witnesses.

GILLMAN H. AMES.

Witnesses:
  N. McMILLAN,
  W. H. AMES.